(12) United States Patent
Sung et al.

(10) Patent No.: US 11,733,741 B2
(45) Date of Patent: Aug. 22, 2023

(54) ELECTRONIC DEVICE INCLUDING CONNECTOR TO WHICH ACCESSORY DEVICE IS ATTACHABLE

(71) Applicant: Samsung Electronics Co., Ltd., Suwon-si (KR)

(72) Inventors: Haewon Sung, Suwon-si (KR); Jungbae Park, Suwon-si (KR); Samyeol Kang, Suwon-si (KR); Bitna Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 246 days.

(21) Appl. No.: 17/309,455

(22) PCT Filed: Nov. 28, 2019

(86) PCT No.: PCT/KR2019/016529
§ 371 (c)(1),
(2) Date: May 27, 2021

(87) PCT Pub. No.: WO2020/111799
PCT Pub. Date: Jun. 4, 2020

(65) Prior Publication Data
US 2021/0373615 A1    Dec. 2, 2021

(30) Foreign Application Priority Data

Nov. 29, 2018  (KR) .................. 10-2018-0151363

(51) Int. Cl.
*G06F 1/16*      (2006.01)
*G06F 3/0354*    (2013.01)

(52) U.S. Cl.
CPC ........ *G06F 1/1684* (2013.01); *G06F 3/03545* (2013.01); *G06F 1/169* (2013.01)

(58) Field of Classification Search
CPC ...... G06F 1/1656; G06F 1/1684; G06F 1/169; G06F 2200/1632; G06F 2200/1639
See application file for complete search history.

(56) References Cited

U.S. PATENT DOCUMENTS 4,865,285 A * 9/1989 Gaggianese ......... B43M 99/004
                                                   211/DIG. 1
5,067,573 A * 11/1991 Uchida .................. G06F 1/1626
                                                        382/314

(Continued)

FOREIGN PATENT DOCUMENTS

JP    2014-063238 A    4/2014
JP    2015-046074 A    3/2015

(Continued)

OTHER PUBLICATIONS

International Search Report and Written Opinion of the International Searching Authority in connection with International Application No. PCT/KR2019/016529 dated Apr. 2, 2020, 8 pages.

(Continued)

*Primary Examiner* — Adrian S Wilson

(57) ABSTRACT

An electronic device to which an accessory device is attachable according to various embodiments of the disclosure includes a housing including a first opening and a second opening and a connector at least partially exposed through the first opening and the second opening. The connector includes a main body, a button part seated on the main body so as to be movable in a first direction or a second direction, a first elastic member mounted between the main body and the button part, a movable part seated on the main body, and a second elastic member mounted between the main body and the movable part. A portion of the button part is exposed through the first opening, and a portion of the movable part is exposed through the second opening.

15 Claims, 10 Drawing Sheets

(56) References Cited

U.S. PATENT DOCUMENTS

| | | | | |
|---|---|---|---|---|
| 5,422,442 | A | * | 6/1995 | Gouda ................... A45C 15/00 211/69.1 |
| 5,627,349 | A | * | 5/1997 | Shetye ............... G06F 3/04883 178/19.01 |
| 5,973,677 | A | * | 10/1999 | Gibbons ............... G06F 1/1632 345/179 |
| 7,053,883 | B1 | * | 5/2006 | Kwok ................... G06F 1/1626 345/156 |
| 7,061,762 | B2 | * | 6/2006 | Canova, Jr. ........... G06F 1/1626 361/679.3 |
| 7,520,034 | B2 | | 4/2009 | Sugita |
| 7,852,621 | B2 | * | 12/2010 | Lin ....................... G06F 1/1616 361/679.02 |
| 7,929,297 | B2 | * | 4/2011 | Chen ..................... H04M 1/026 361/679.56 |
| 8,363,036 | B2 | | 1/2013 | Liang |
| 8,493,368 | B2 | * | 7/2013 | Hsieh ................. G06F 3/03545 345/179 |
| 8,902,574 | B2 | * | 12/2014 | Su ........................ G06F 1/1656 361/801 |
| 8,963,870 | B2 | | 2/2015 | Namkung |
| 9,063,693 | B2 | * | 6/2015 | Raken ................... G06F 1/1656 |
| 9,268,379 | B2 | * | 2/2016 | Ashcraft ............... G06F 3/0393 |
| 9,395,753 | B2 | * | 7/2016 | Amano ................ B65D 25/005 |
| 9,424,048 | B2 | * | 8/2016 | Jakoboski ........... H01R 31/065 |
| 9,575,579 | B2 | * | 2/2017 | Ashcraft ............... G06F 3/0393 |
| 9,596,914 | B2 | | 3/2017 | Zaloom |
| 9,778,700 | B2 | * | 10/2017 | Zaloom ................ G06F 1/1656 |
| 9,903,686 | B2 | | 2/2018 | Maynard |
| 10,027,788 | B2 | | 7/2018 | Pierce |
| 10,408,246 | B2 | * | 9/2019 | Hu ............................ F16B 1/00 |
| 10,411,748 | B1 | | 9/2019 | Lucente ................. H04M 1/04 |
| 10,649,548 | B2 | * | 5/2020 | Pirie .................. G06F 3/03545 |
| 11,139,850 | B2 | * | 10/2021 | Nyholm ................. H04M 1/21 |
| 2006/0109617 | A1 | * | 5/2006 | Chen .................. G06F 3/03545 361/679.55 |
| 2007/0193008 | A1 | | 8/2007 | Sugita |
| 2007/0236467 | A1 | * | 10/2007 | Marshall ............... G06F 1/1626 345/173 |
| 2010/0021022 | A1 | * | 1/2010 | Pittel .................. G06F 3/03545 206/320 |
| 2011/0310065 | A1 | | 12/2011 | Liang |
| 2012/0086391 | A1 | * | 4/2012 | Smith ................... H02J 7/0044 320/137 |
| 2013/0021729 | A1 | * | 1/2013 | Su ......................... G06F 1/1698 361/679.01 |
| 2014/0049894 | A1 | * | 2/2014 | Rihn ..................... H01F 7/0263 335/219 |
| 2014/0125606 | A1 | * | 5/2014 | Namkung ............... G06F 1/169 345/173 |
| 2014/0347814 | A1 | | 11/2014 | Zaloom |
| 2015/0289634 | A1 | * | 10/2015 | Chavez ................... A45F 5/004 224/162 |
| 2016/0118016 | A1 | | 4/2016 | DiPrizio |
| 2016/0146575 | A1 | | 5/2016 | Maynard |
| 2016/0147316 | A1 | * | 5/2016 | Ashcraft ............. G06F 3/03545 345/179 |
| 2016/0255931 | A1 | * | 9/2016 | Nakagawa ............. A45C 13/02 |
| 2017/0156465 | A1 | | 6/2017 | Zaloom |
| 2017/0336827 | A1 | * | 11/2017 | Lukic .................... G06F 1/1633 |
| 2019/0181905 | A1 | * | 6/2019 | Griffin, II ............ H04B 1/3888 |
| 2022/0043479 | A1 | * | 2/2022 | Moon ................... G06F 3/0221 |

FOREIGN PATENT DOCUMENTS

| | | |
|---|---|---|
| JP | 2016-157380 A | 9/2016 |
| KR | 10-2014-0056959 A | 5/2014 |
| KR | 10-2015-0017195 A | 2/2015 |
| KR | 10-2016-0001563 A | 1/2016 |
| KR | 10-2017-0088354 A | 8/2017 |

OTHER PUBLICATIONS

Korean Intellectual Property Office, "Written Decision on Registration," dated Jan. 25, 2023, in connection with Korean Patent Application No. 10-2018-0151363, 8 pages.

\* cited by examiner

ELECTRONIC DEVICE INCLUDING CONNECTOR TO WHICH ACCESSORY DEVICE IS ATTACHABLE

CROSS-REFERENCE TO RELATED APPLICATIONS

This application is a 371 of International Application No. PCT/KR2019/016529, filed Nov. 28, 2019, which claims priority to Korean Patent Application No. 10-2018-0151363, filed Nov. 29, 2018, the disclosures of which are herein incorporated by reference in their entirety.

BACKGROUND

1. Field

Various embodiments of the disclosure described herein relate to an electronic device including a connector to which an accessory device is attachable.

2. Description of Related Art

Electronic devices, such as smartphones or tablet PCs, have been used in various fields. The electronic devices may be used together with various types of accessory devices. For example, the electronic devices may be paired with electronic pens. The electronic devices may operate in response to touch or hovering inputs using the electronic pens.

In a case where an electronic device in the related art is used together with an accessory device such as an electronic pen, there is no space for storing the accessory device in the electronic device, or the electronic device has a separate inner space for storing the electronic pen. When there is no storage space, a user has the inconvenience of having to carry the electronic pen separately from the electronic device. When there is a storage space, due to deficiency of a mounting space of the electronic device, an electronic pen having a shape identical or similar to that of an actual pen is not able to be used, and a thin electronic pen is used. Accordingly, a user feels an inconvenience to use the electronic pen.

SUMMARY

Various embodiments of the disclosure provide an electronic device including a connector to which an accessory device is attachable. A user may store the accessory device, which is used together with the electronic device, together with the electronic device.

An electronic device to which an accessory device is attachable, according to various embodiments of the disclosure, includes a housing including a first surface that faces a first direction, a second surface that faces a second direction opposite to the first direction, a third surface that faces a third direction perpendicular to the first direction or the second direction, a first opening formed in the second surface, and a second opening formed in the third surface, and a connector at least partially exposed through the first opening and the second opening. The connector includes a main body, a button part seated on the main body so as to be movable in the first direction or the second direction, a first elastic member mounted between the main body and the button part, a movable part seated on the main body so as to be movable in the third direction, and a second elastic member mounted between the main body and the movable part. A portion of the button part is exposed through the first opening, and a portion of the movable part is exposed through the second opening.

The electronic device according to the various embodiments of the disclosure may include the connector to which the accessory device is attachable. Accordingly, a user may store the accessory device, which is used together with the electronic device, together with the electronic device.

The connector of the electronic device according to the various embodiments of the disclosure may maintain a smooth surface in appearance in a state in which the external connector is not connected.

The connector of the electronic device according to the various embodiments of the disclosure may be coupled in an easy and simple manner in response to introduction of the external connector, and the external connector may be withdrawn by simple manipulation of the button in the coupled state.

DETAILED DESCRIPTION

Hereinafter, various embodiments of the disclosure will be described with reference to the accompanying drawings.

Figure 1:
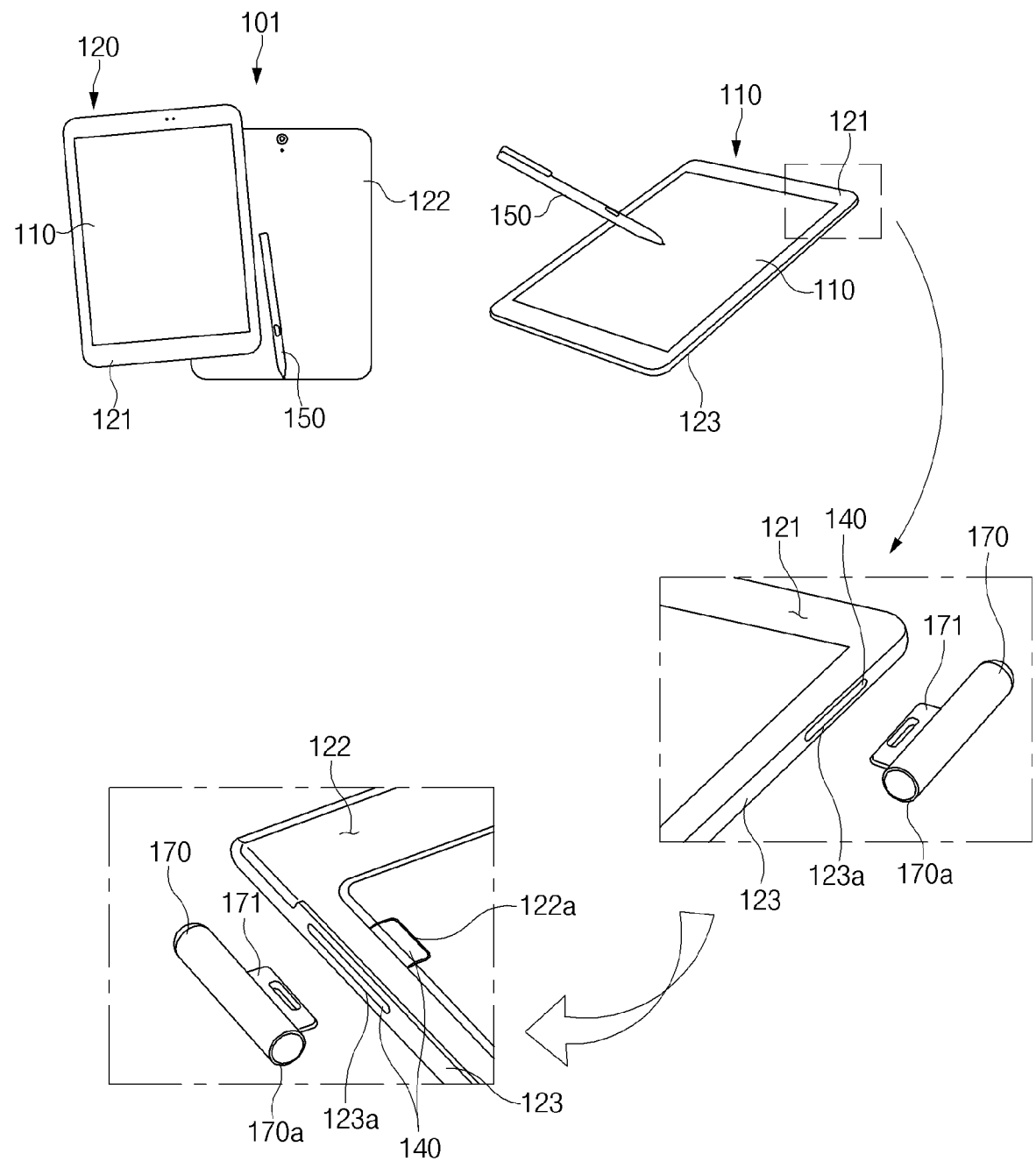
FIG. 1 illustrates an electronic device according to various embodiments.

FIG. 1 illustrates an electronic device according to various embodiments.

Referring to FIG. 1, the electronic device 101 may include a display 110 and a housing 120.

The display 110 may include, for example, a liquid crystal display (LCD), a light emitting diode (LED) display, an organic light emitting diodes (OLED) display, a microelectromechanical systems (MEMS) display, or electronic paper. The display 110 may, for example, display various types of contents (e.g., text, images, videos, icons, and/or symbols) to a user. The display 110 may include a touch screen and may receive, for example, a touch, gesture, proximity, or hovering input using an electronic pen or a part of the user's body. The display 110 may include a glass cover (or, a window panel) exposed to the outside and various layers inward of the glass cover.

The housing 120 may include a first surface 121 (hereinafter, referred to as the front surface), a second surface 122 (hereinafter, referred to as the rear surface), and a third surface (hereinafter, referred to as the side surface). The housing 120 may have the display 110 mounted thereon such that an active area of the display 110 is mainly disposed. The housing 120 may contain various components (e.g., a processor, a memory, communication circuitry, a battery, or a circuit board) for driving the electronic device 101.

According to various embodiments, the electronic device 101 may be used together with an external accessory device 150 (e.g., an electronic pen). For example, the electronic device 101 may receive a touch input or a hovering input using an electronic pen through the display 110.

According to various embodiments, the accessory device 150 may be mounted on the electronic device 101 through an external connector 170. For example, when the accessory device 150 is an electronic pen, the external connector 170 may include a cylindrical hole 170a and a fastening part 171. At least a portion of the electronic pen may be fixedly inserted into the hole 170a. The user may store the accessory device 150 together with the electronic device 101 by using the external connector 170. The user may separate the accessory device 150 from the external connector 170 for use as needed.

According to various embodiments, the housing 120 may contain a connector 140 having a form corresponding to the fastening part 171 of the external connector 170. The housing 120 may include a first opening 122a and a second opening 123a through which portions of the connector 140 are exposed to the outside. The first opening 122a and the second opening 123a may be formed in different surfaces. The portions of the connector 140 exposed to the outside through the first opening 122a and the second opening 123a may form smooth surfaces with the housing 120, or may be implemented as integrated design.

Hereinafter, it will be exemplified that the first opening 122a is formed in the rear surface 122 of the housing 120 and the second opening 123a is formed in the side surface 123 of the housing 120. However, the disclosure is not limited thereto. For example, the first opening 122a may be formed in the front surface 121 of the housing 120, and the second opening 123a may be formed in the side surface 123 of the housing 120.

According to various embodiments, the connector 140 and the external connector 170 may be electrically connected with each other. The processor of the electronic device 101 may detect whether the connector 140 and the external connector 170 are coupled with each other. Through the display 110, the processor may inform the user as to whether the connector 140 and the external connector 170 are coupled with, or separated from, each other.

According to various embodiments, when the external connector 170 and the accessory device (e.g., the electronic pen) 150 are electrically connected and the connector 140 and the external connector 170 are electrically connected, the processor of the electronic device 101 may detect, through the connector 140, whether the external connector 170 and the accessory device (e.g., the electronic pen) 150 are coupled. Through the display 110, the processor may inform the user as to whether the external connector 170 and the accessory device (e.g., the electronic pen) 150 are coupled with, or separated from, each other.

Figure 2:
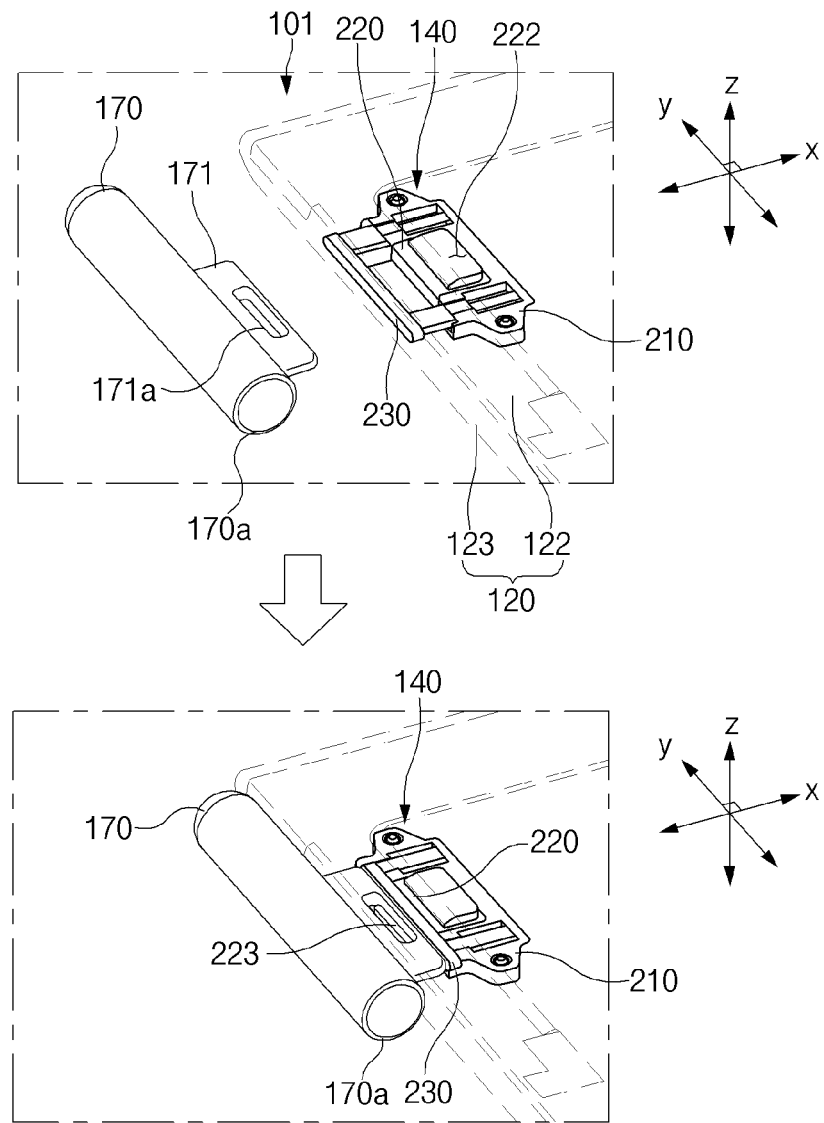
FIG. 2 is a transparent view of the electronic device illustrating a coupling of a connector and an external connector according to various embodiments.

FIG. 2 is a transparent view of the electronic device illustrating a coupling of the connector and the external connector according to various embodiments.

Referring to FIG. 2, the housing 120 of the electronic device 101 may contain the connector 140. The connector 140 may be coupled with, or separated from, the fastening part 171 of the external connector 170 introduced from the outside. The connector 140 may include a main body 210, a button part 220, and a movable part 230.

The main body 210 may have the button part 220 and the movable part 230 mounted thereon. The main body 210 may include a first elastic member (e.g., a spring) between the main body 210 and the button part 220, and the button part 220 may be moved in an up/down direction (a direction toward the front surface 121 or the rear surface 122 of the housing 1120 or the Z-axis direction) by an elastic force of the first elastic member (refer to FIG. 3).

Figure 4:
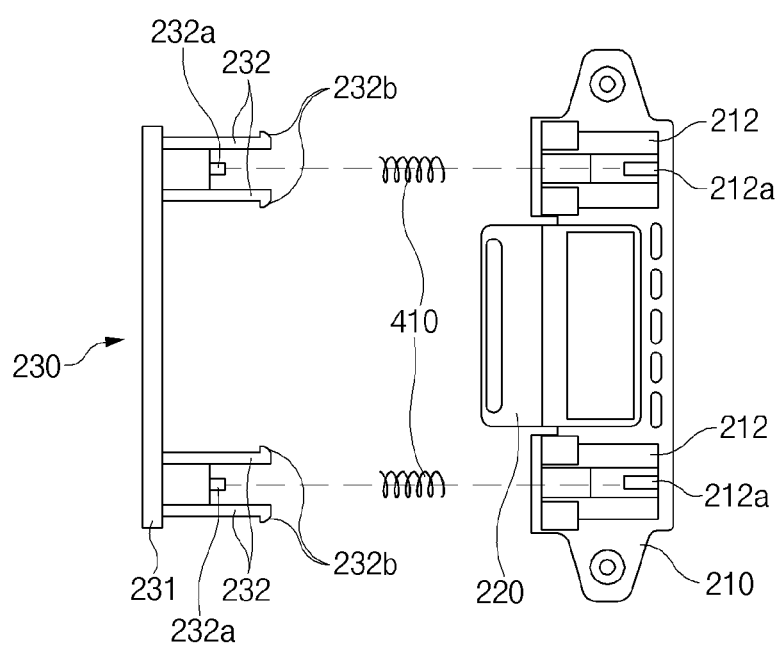
FIG. 4 illustrates a coupling of the main body and a movable part according to various embodiments.

The main body 210 may include a second elastic member (e.g., a spring) between the main body 210 and the movable part 230, and the movable part 230 may be moved in a left/right direction (a direction toward the side surface 123 of the housing 1120 or the X-axis direction) by an elastic force of the second elastic member (refer to FIG. 4).

At least a portion (a button 222) of the button part 220 may be exposed through the first opening 122a of FIG. 1. The button part 220 may include a protruding structure 223 inside. When the external connector 170 is introduced into the connector 140, the protruding structure 223 may be coupled with a hole 171a formed in the external connector 170 (refer to FIGS. 3 and 5). When external pressure is applied to the button 222, the protruding structure 223 may be separated from the fastening part 171 of the external connector 170.

The movable part 230 may move depending on introduction or withdrawal of the fastening part 171 of the external connector 170. When the fastening part 171 of the external connector 170 is introduced, the movable part 230 may be pushed by the external connector 170 and may be moved toward the inside of the electronic device 101.

In a state in which the external connector 170 is withdrawn, the movable part 230 may be moved toward the outside of the electronic device 101 by the elastic force of the second elastic member (e.g., a spring) (refer to FIG. 4). At least a portion of the movable part 230 may be stopped by an inner surface of the main body 210. A surface of the movable part 230 exposed through the second opening 123a may form a smooth surface with the side surface 123 of the housing 120. According to an embodiment, the exposed surface of the movable part 230 may have the same material or the same color as the side surface 123 of the housing 120.

Figure 3:
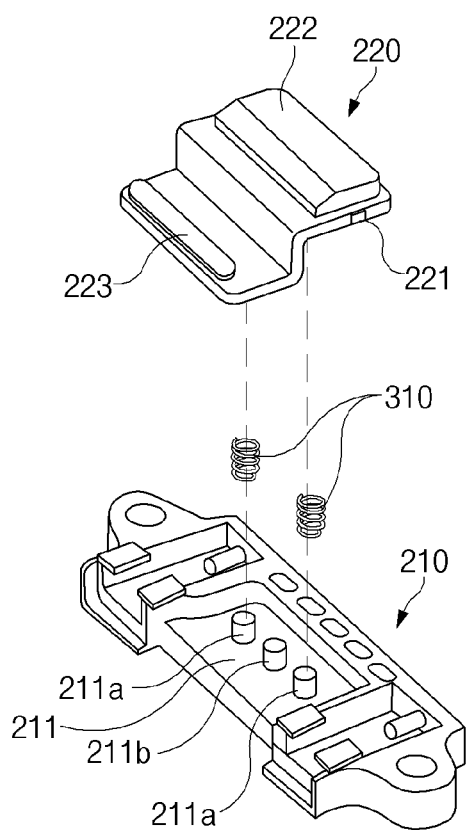
FIG. 3 illustrates a coupling of a main body and a button part according to various embodiments.

FIG. 3 illustrates a coupling of the main body and the button part according to various embodiments.

Referring to FIG. 3, the main body 210 may be coupled with the button part 220. The main body 210 may include a first seating area 211. A portion of the button part 220 (a portion including the button 222) may be seated on the first seating area 211.

The main body 210 may include a first elastic member 310 (e.g., a spring) on a rear surface of the button part 220 (a surface facing away from a surface on which the button 222 is disposed). The first elastic member 310 may have an elastic force in a direction in which the main body 210 and the button part 220 are coupled.

When external pressure is applied to the button 222, the first elastic member 310 may be compressed. The button part 220 may be moved toward the inside of the electronic device 101, and accordingly the distance from the main body 210 may be decreased.

When the external pressure is removed, the first elastic member 310 may push the button part 220 by an elastic force. The button 222 of the button part 220 may be moved toward the outside of the electronic device 101 by the elastic force of the first elastic member 310. The button part 220 may be maintained in a state in which a separation prevention protrusion 221 is stopped by a housing surface inside the electronic device 101.

According to various embodiments, the first seating area 211 may include a first protrusion 211a for fixing or guiding the first elastic member 310. The first protrusion 211a may protrude from the first seating area 211 toward the button part 220.

According to an embodiment, a plurality of first elastic members 310 may be provided, and as many first protrusions 211a as the first elastic members 310 may be formed. Although FIG. 3 illustrates an example that two first elastic members 310 and two first protrusions 211a are provided, the disclosure is not limited thereto.

According to various embodiments, the first seating area 211 may include a second protrusion 211b for guiding a movement of the button part 220. The second protrusion 211b may protrude from the first seating area 211 toward the button part 220. The second protrusion 211b may have a shape corresponding to a hole (not illustrated) that is formed on the rear surface of the button part 220 (the surface facing away from the surface on which the button 222 is disposed, or the surface facing toward the main body 210). The hole may have a larger diameter than the second protrusion 211b.

The button part 220 may include the separation prevention protrusion 221, the button 222, and the protruding structure 223. The button part 220 may be implemented in a stair form having a step.

The separation prevention protrusion 221 may prevent separation of the button part 220. In a state in which the external pressure is not applied, the first elastic members 310 may push the button part 220 by elastic forces. The button part 220 may be maintained in a state in which the separation prevention protrusion 221 is stopped by an inner surface of the electronic device 101.

The button 222 may be exposed to the outside through the first opening 122a of the housing 120. When external pressure is applied to the button 222, the button part 220 may be moved toward the inside of the electronic device 101.

The protruding structure 223 may be coupled with the fastening part 171 of the external connector 170. When the fastening part 171 is introduced into the connector 140, the protruding structure 223 may be coupled to the hole 171a of the fastening part 171 to prevent separation of the fastening part 171 to the outside. A surface of the protruding structure 223 that faces toward the outside of the electronic device 101 may be formed to be an inclined surface. In this case, the fastening part 171 may be introduced into the connector 140 along the inclined surface and may be coupled by the protruding structure 223.

FIG. 4 illustrates a coupling of the main body and the movable part according to various embodiments.

Referring to FIG. 4, the main body 210 may be additionally coupled with the movable part 230 in the state of being coupled with the button part 220. The main body 210 may be coupled with the movable part 230 in a direction different from the direction in which the main body 210 and the button part 220 are coupled.

The main body may include second seating areas 212. Supports 232 of the movable part 230 may be seated on the second seating areas 212. The second seating areas 212 may be disposed on opposite sides of the first seating area 211 on which the button part 220 is seated.

Second elastic members 410 (e.g., springs) may be disposed between the main body 210 and the supports 232 of the movable part 230. The second elastic members 410 may have elastic forces in the direction in which the main body 210 and the movable part 230 are coupled.

When the fastening part 171 of the external connector 170 is introduced into the connector 140, the second elastic members 410 may be compressed depending on a movement of the movable part 230.

When the fastening part 171 of the external connector 170 is withdrawn, the second elastic members 410 may push the movable part 230 by elastic forces. The movable part 230 may be moved toward the outside of the electronic device 101 by the elastic forces of the second elastic members 410. The movable part 230 may be maintained in a state in which stopping structures 232b formed on the supports 232 are stopped by inner surfaces of the main body 210.

According to various embodiments, the second seating areas 212 may include third protrusions 212a for fixing or guiding the second elastic members 410. The third protrusions 212a may protrude from the second seating areas 212 toward the movable part 230.

According to an embodiment, a plurality of second elastic members 410 may be provided, and as many third protrusions 212a as the second elastic members 410 may be formed. Although FIG. 4 illustrates an example that two second elastic members 410 and two third protrusions 212a are provided, the disclosure is not limited thereto.

The movable part 230 may include a plate 231 and the supports 232.

The plate 231 may be exposed to the outside through the second opening 123a of the housing 120. The plate 231 may form a smooth surface with the side surface 123 of the housing 120. When the fastening part 171 of the external connector 170 is introduced, the plate 231 may be moved toward the inside of the electronic device 101 in a state of making contact with the fastening part 171.

The supports 232 may be mounted on an inner surface of the plate 231. The supports 232 may include fourth protrusions 232a for fixing or guiding the second elastic members 410. The fourth protrusions 232a may protrude toward the second seating areas 212. As many fourth protrusions 232a as the second elastic members 410 may be formed.

The supports 232 may include the stopping structures 232b. The stopping structures 232b may prevent separation of the movable part 230. In a state in which the fastening part 171 of the external connector 170 is withdrawn, the second elastic members 410 may push the movable part 230 by elastic forces. The movable part 230 may be maintained in a state in which the stopping structures 232b are stopped by the inner surfaces of the main body 210. The plate 231 of the movable part 230 may form a smooth surface with the side surface 123 of the housing 120 in the state in which the stopping structures 232b are stopped by the inner surfaces of the main body 210.

Figure 5:
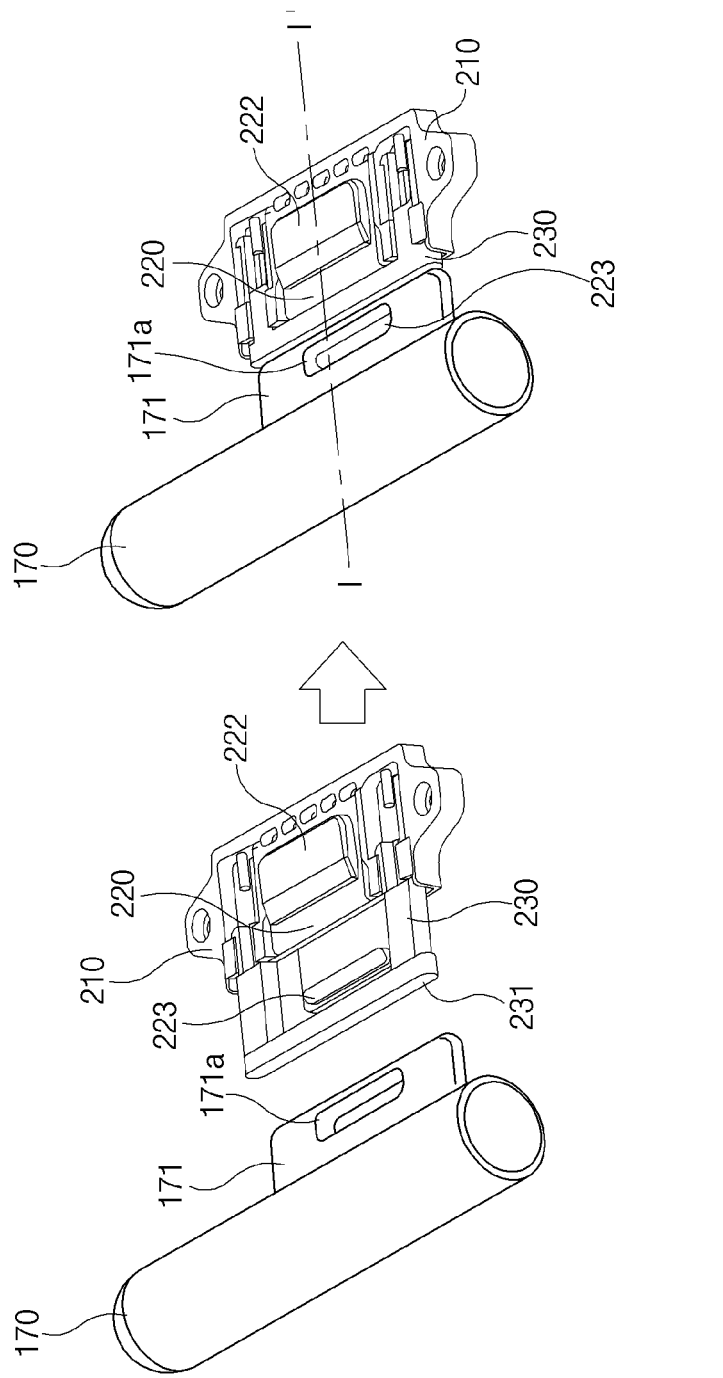
FIG. 5 illustrates a coupling of the connector and the external connector according to various embodiments.

FIG. 5 illustrates a coupling of the connector and the external connector according to various embodiments.

Referring to FIG. 5, the plate 231 of the movable part 230 may be exposed to the outside before the fastening part 171 of the external connector 170 for connecting the accessory device (e.g., the electronic pen) 150 is introduced. In the state in which the stopping structures 232b are stopped by the inner surfaces of the main body 210, the plate 231 may form a smooth surface with the side surface 123 of the housing 120.

When the fastening part 171 of the external connector 170 is introduced, the movable part 230 may be moved toward the inside of the electronic device 101 in a state in which the plate 231 makes contact with the fastening part 171. The second elastic members 410 between the movable part 230 and the main body 210 may be compressed.

The fastening part 171 of the external connector 170 may move along the inclined surface of the protruding structure 223 of the button structure 220. When the hole 171a of the fastening part 171 overlaps the protruding structure 223, the protruding structure 223 may be coupled with the hole 171a of the fastening part 171 by the elastic forces of the first elastic members 310.

The fastening part 171 of the external connector 170 may be withdrawn to the outside when external pressure is applied to the button 222 of the button part 220. The protruding structure 223 may be separated from the hole 171a of the fastening part 171 by the external pressure. The plate 231 of the movable part 230 may push the fastening part 171 outward by the elastic forces of the second elastic members 410 between the movable part 230 and the main body 210.

When the fastening part 171 is completely withdrawn from the connector 140, the stopping structures 232b of the movable part 230 may be stopped by the inner surfaces of the main body 210. The plate 231 of the movable part 230 may form a smooth surface with the side surface 123 of the housing 120.

Figure 6:
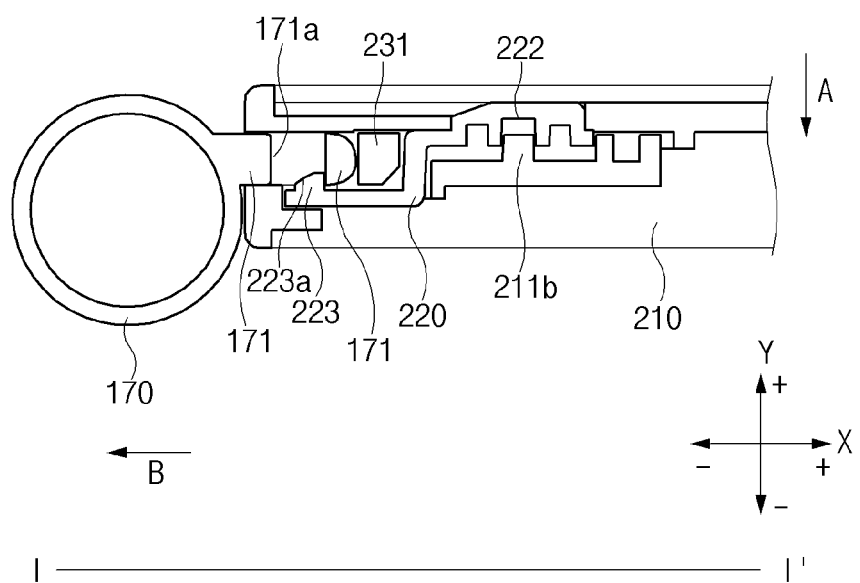
FIG. 6 is a sectional view illustrating the external connector and the connector coupled together according to various embodiments.

FIG. 6 is a sectional view illustrating the external connector and the connector coupled together according to various embodiments. FIG. 6 may be a sectional view taken along line I-I' in FIG. 5.

Referring to FIG. 6, when the fastening part 171 of the external connector 170 is introduced in the x+ direction, the movable part 230 may move in the x+ direction in a state in which the plate 231 makes contact with the fastening part 171.

The fastening part 171 of the external connector 170 may move along an inclined surface 223a of the protruding structure 223 of the button part 220. When the hole 171a of the fastening part 171 overlaps the protruding structure 223, the protruding structure 223 may be coupled with the hole 171a of the fastening part 171 by the elastic forces of the first elastic members 310.

When external pressure is applied to the button 222 of the button part 220 in the y- direction, the button part 220 may be moved in the y- direction. The second protrusion 211b may guide the movement of the button part 220. The protruding structure 223 may be separated from the hole 171a of the fastening part 171 while being moved in the y- direction by the external pressure. The plate 231 of the movable part 230 may push the fastening part 171 in the x- direction by the elastic forces of the second elastic members 410. When the fastening part 171 is completely withdrawn from the connector 140, the plate 231 of the movable part 230 may form a smooth surface with the side surface 123 of the housing 120.

Figure 7:
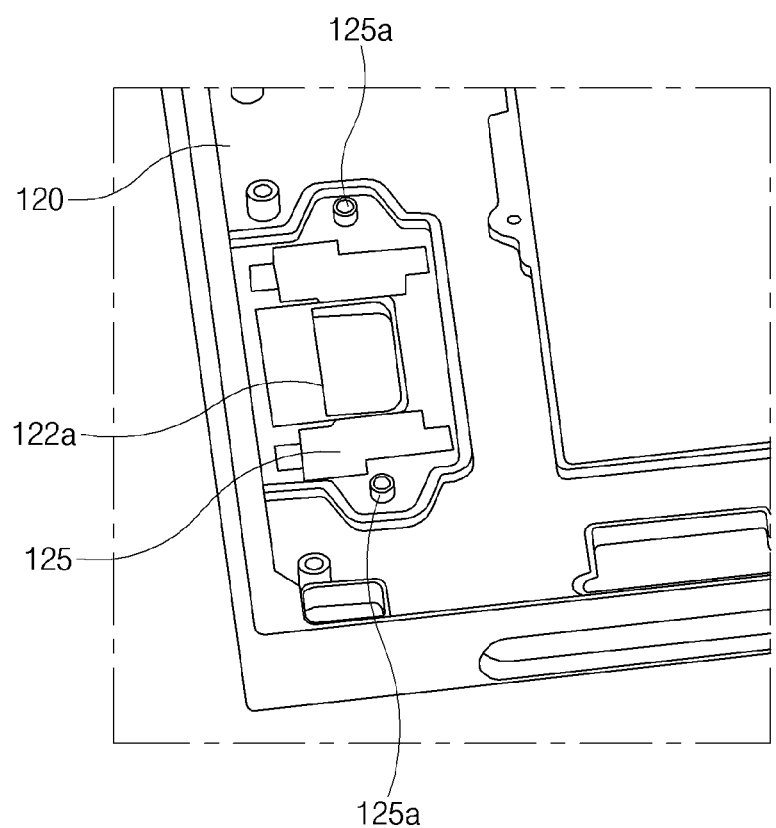
FIGS. 7 and 8 illustrate a form in which the connector is coupled to the inside of a housing according to various embodiments.
Figure 8:
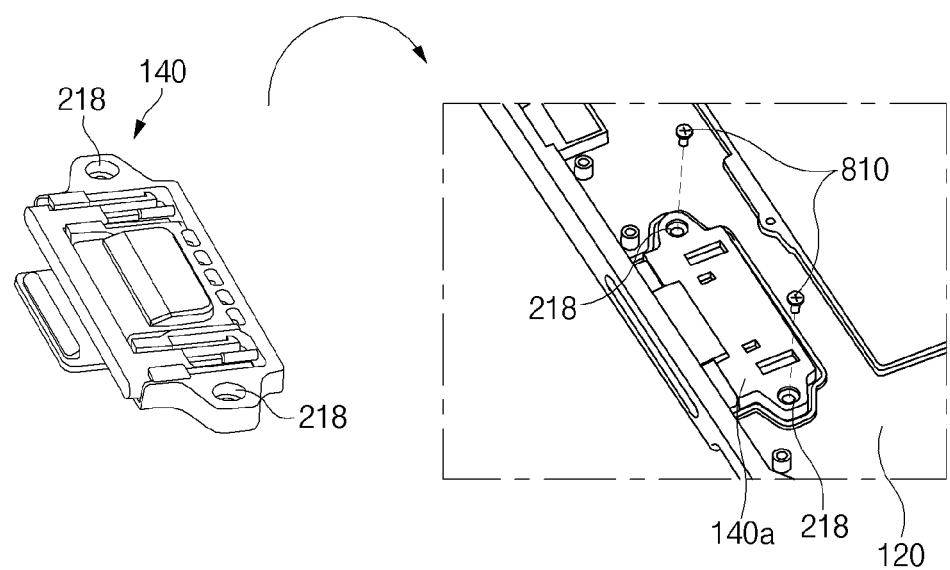

FIGS. 7 and 8 illustrate a form in which the connector is coupled to the inside of the housing according to various embodiments.

Referring to FIG. 7, the housing 120 may include a connector seating area 125 on an inner surface of the first opening 122a. The connector seating area 125 may have a form corresponding to the button part 220 of the connector 140. The connector seating area 125 may include coupling parts 125a for fixing the connector 140 to an inner surface of the housing 120.

Referring to FIG. 8, the connector 140 may be coupled to the connector seating area 125 such that the button 222 of the button part 220 is exposed through the first opening 122a. A rear surface 140a of the connector 140 may face toward the inside of the electronic device 101. The main body 210 may include holes 218 for fixing the main body 210 to the housing 120. The main body 210 may be fixed by fixing parts 810 that pass through the holes 218 and that are coupled with the coupling parts 125a of the connector seating area 125.

Figure 9:
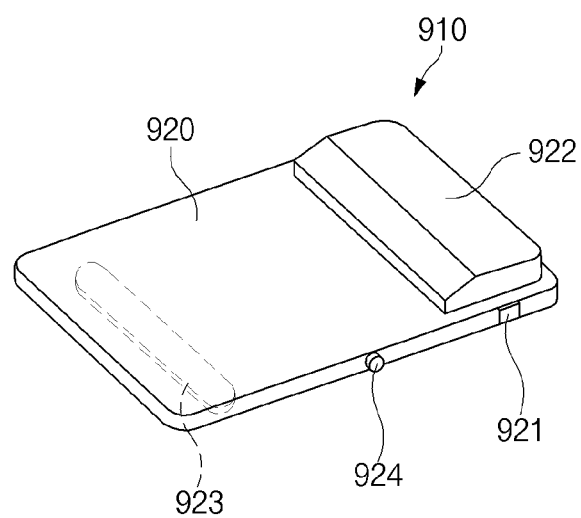
FIG. 9 illustrates a button part in a flat form according to various embodiments.

FIG. 9 illustrates a button part in a flat form according to various embodiments.

Referring to FIG. 9, the button part 910 may include a plate 920, a separation preventing protrusion 921, a button 922, a protruding structure 923, and a central protrusion 924.

The plate 920 may have a flat form rather than a stair form. Unlike in FIGS. 1 to 8, the protruding structure 923 may be formed on a rear surface of the plate 920.

The plate 920 may rotate about the central protrusion 924 in a specified range. The protruding structure 923 and the fastening part 171 of the external connector 170 may be coupled with, or separated from, each other by the rotation.

When external pressure is applied to the button 922 in a state in which the protruding structure 923 and the fastening part 171 of the external connector 170 are coupled with each other, the plate 920 may rotate about the central protrusion 924 in the clockwise direction. The protruding structure 923 may be separated from the fastening part 171 of the external connector 170 by the rotation.

Figure 10:
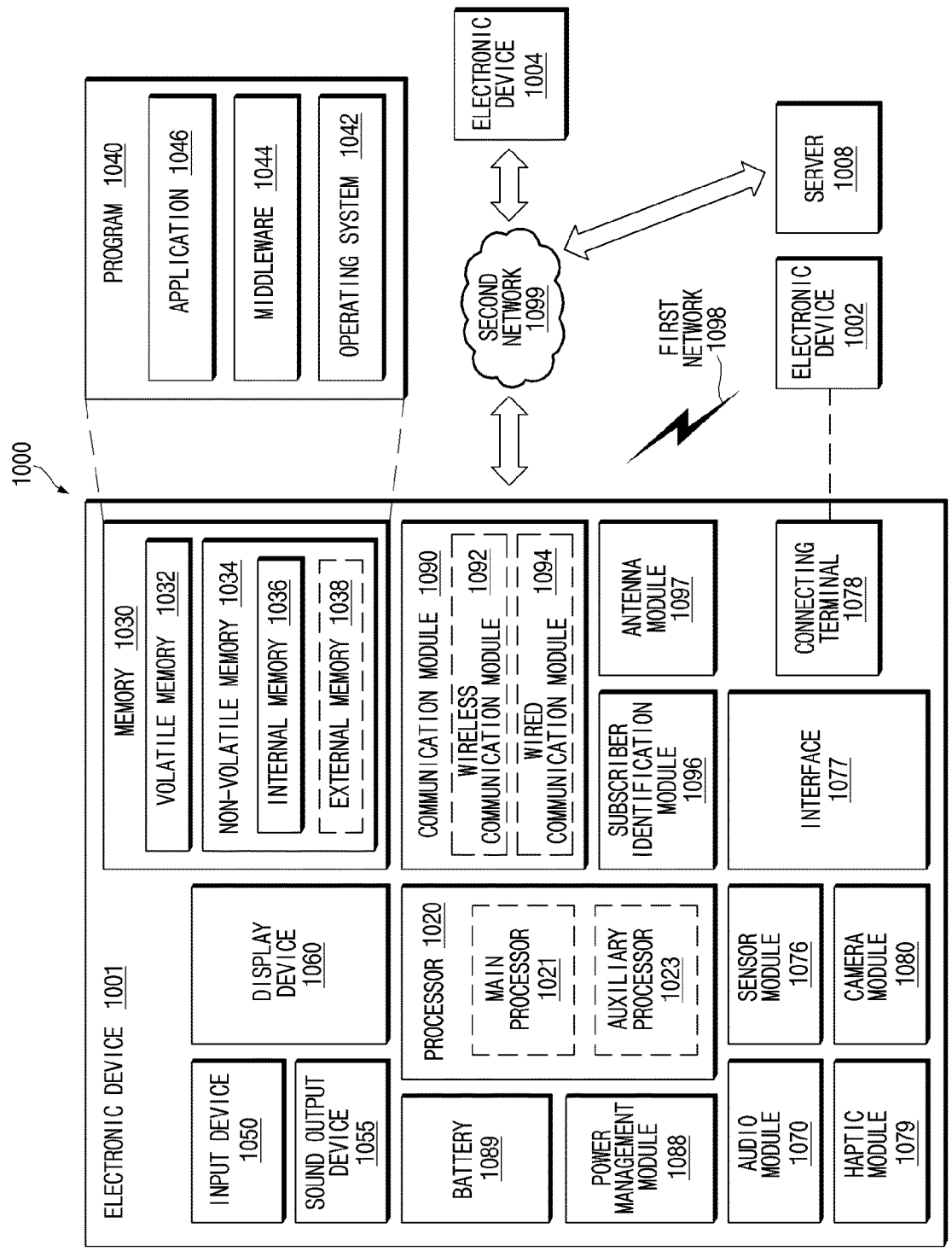
FIG. 10 is a block diagram of an electronic device in a network environment according to various embodiments.

FIG. 10 illustrates a block diagram of an electronic device 2001 in a network environment 2000, according to various embodiments.

Referring to FIG. 10, the electronic device 1001 in the network environment 1000 may communicate with an electronic device 1002 over a first network 1098 (e.g., a short range wireless communication network) or may communicate with an electronic device 1004 or a server 1008 over a second network 1099 (e.g., a long distance wireless communication network). According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, or an antenna module 1097. In any embodiment, at least one (e.g., the display device 1060 or the camera module 1080) of the components may be omitted from the electronic device 1001, or one or more other components may be further included in the electronic device 1001. In any embodiment, some of the components may be implemented with a single integrated circuit. For example, the sensor module 1076 (e.g., a fingerprint sensor, an iris sensor, or an illumination sensor) may be embedded in the display device 1060 (e.g., a display).

The processor 1020 may execute, for example, software (e.g., a program 1040) to control at least one other component (e.g., a hardware or software component) of the electronic device 1001 connected to the processor 1020, and may perform various data processing or operations. According to an embodiment, as at least a part of the data processing or operations, the processor 1020 may load a command or data received from any other component (e.g., the sensor module 1076 or the communication module 1090) to a volatile memory 1032, may process the command or data stored in the volatile memory 1032, and may store processed data in a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which may be operated independently of or together with the main processor 1021. Additionally or alternatively, the auxiliary processor 1023 may be configured to use lower power than the main processor 1021 or to be specialized for a specified function. The auxiliary processor 1023 may be implemented separately from the main processor 1021 or may be implemented as a part of the main processor 1021.

The auxiliary processor 1023 may control at least a part of a function or states associated with at least one component (e.g., the display device 1060, the sensor module 1076, or the communication module 1090) of the electronic device 1001, for example, instead of the main processor 1021 while the main processor 1021 is in an inactive (e.g., sleep) state and together with the main processor 1021 while the main processor 1021 is in an active (e.g., an application execution) state. According to an embodiment, the auxiliary processor 1023 (e.g., an image signal processor or a communication processor) may be implemented as a part of any other component (e.g., the camera module 1080 or the communication module 1090) which is functionally associated with the auxiliary processor 1023.

The memory 1030 may store various data which are used by at least one component (e.g., the processor 1020 or the sensor module 1076) of the electronic device 1001. The data may include, for example, software (e.g., the program 1040), or input data or output data associated with a command of the software. The memory 1030 may include the volatile memory 1032 or the nonvolatile memory 1034.

The program 1040 may be stored in the memory 1030 as software, and may include, for example, an operating system 1042, a middleware 1044, or an application 1046.

The input device 1050 may receive a commands or data which will be used by a component (e.g., the processor 1020) of the electronic device 1001, from the outside (e.g., a user) of the electronic device 1001. The input device 1050 may include, for example, a microphone, a mouse, or a keyboard.

The sound output device 1055 may output a sound signal to the outside of the electronic device 1001. The sound output device 1055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1060 may visually provide information to the outside (e.g., the user) of the electronic device 1001. The display device 1060 may include, for example, a display, a hologram device, or a control circuit for controlling a projector and a corresponding device. According to an embodiment, the display device 1060 may include a touch circuitry configured to sense a touch, or a sensor circuitry (e.g., a pressure sensor) configured to measure the strength of force generated by the touch.

The audio module 1070 may convert sound to an electrical signal, or reversely, may convert an electrical signal to sound. According to an embodiment, the audio module 1070 may obtain sound through the input device 1050, or may output sound through the sound output device 1055, or through an external electronic device (e.g., the electronic device 1002) (e.g., a speaker or a headphone) directly or wirelessly connected with the electronic device 1001.

The sensor module 1076 may sense an operation state (e.g., power or a temperature) of the electronic device 1001 or an external environment state (e.g., a user state), and may generate an electrical signal or a data value corresponding the sensed state. According to an embodiment, the sensor module 1076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1077 may support one or more specified protocols that may be used to directly and wirelessly connect the electronic device 1001 with an external electronic device (e.g., the electronic device 1002). According to an embodiment, the interface 1077 may include, for example, a high definition multimedia interface (HDMI), a universal serial bus (USB) interface, a secure digital (SD) card interface, or an audio interface.

A connection terminal 1078 may include a connector that may allow the electronic device 1001 to be physically connected with an external electronic device (e.g., the electronic device 1002). According to an embodiment, the connection terminal 1078 may include, for example, a HDMI connector, a USB connector, a SD card connector, or an audio connector (e.g., a headphone connector).

The haptic module 1079 may convert an electrical signal to a mechanical stimulation (e.g., vibration or movement) or an electrical stimulation which the user may perceive through the sense of touch or the sense of movement. According to an embodiment, the haptic module 1079 may include, for example, a motor, a piezoelectric sensor, or an electrical stimulation device.

The camera module 1080 may photograph a still image and a video. According to an embodiment, the camera module 1080 may include one or more lenses, image sensors, image signal processors, or flashes (or electrical flashes).

The power management module 1088 may manage the power which is supplied to the electronic device 1001. According to an embodiment, the power management module 1088 may be implemented, for example, as at least a part of a power management integrated circuit (PMIC).

The battery 1089 may power at least one component of the electronic device 1001. According to an embodiment, the battery 1089 may include, for example, a primary cell not recharged, a secondary cell rechargeable, or a fuel cell.

The communication module 1090 may establish a direct (or wired) communication channel or a wireless communication channel between the electronic device 1001 and an external electronic device (e.g., the electronic device 1002, the electronic device 1004, or the server 1008) or may perform communication through the established communication channel. The communication module 1090 may include one or more communication processors which is operated independently of the processor 1020 (e.g., an application processor) and supports direct (or wired) communication or wireless communication. According to an embodiment, the communication module 1090 may include a wireless communication module 1092 (e.g., a cellular communication module, a short range wireless communication module, or a global navigation satellite system (GNSS) communication module) or a wired communication module 1094 (e.g., a local area network (LAN) communication module or a power line communication module). A corresponding communication module of such communication modules may communicate with an external electronic device over the first network 1098 (e.g., a short range communication network such as Bluetooth, Wi-Fi direct, or infrared data association (IrDA)) or the second network 1099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1092 may verify and authenticate the electronic device 1001 within a communication network, such as the first network 1098 or the second network 1099, by using subscriber information (e.g., international mobile subscriber identity (IMSI)) stored in the subscriber identification module 1096.

The antenna module 1097 may transmit a signal or a power to the outside (e.g., an external electronic device) or may receive a signal or a power from the outside. According to an embodiment, the antenna module 1097 may include one or more antennas, and at least one antenna which is suitable for a communication scheme used in a computer network such as the first network 1098 or the second network 1099 may be selected, for example, by the communication module 1090 from the one or more antennas. The signal or power may be exchanged between the communication module 1090 and an external electronic device through the selected at least one antenna or may be received from the external electronic device through the selected at least one antenna and the communication module 1090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1001 and the external electronic device 1004 through the server 1008 connecting to the second network 1099. Each of the electronic devices 1002 and 1004 may be a device, the kind of which is the same as or different from a kind of the electronic device 1001. According to an embodiment, all or a part of operations to be executed in the electronic device 1001 may be executed in one or more external devices of the external electronic devices 1002, 1004, or 1008. For example, in the case where the electronic device 1001 should perform any function or service automatically or in response to a request from the user or any other device, the electronic device 1001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1001. The electronic device 1001 may process received result as it is or additionally, and may provide a result of the processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

An electronic device (e.g., the electronic device 101 of FIG. 1) to which an accessory device is attachable, according to various embodiments, may include a housing (e.g., the housing 120 of FIG. 1) that includes a first surface (e.g., the first surface 121 of FIG. 1) that faces a first direction, a second surface (e.g., the second surface 122 of FIG. 1) that faces a second direction opposite to the first direction, a third surface (e.g., the third surface 123 of FIG. 1) that faces a third direction perpendicular to the first direction or the second direction, a first opening (e.g., the first opening 122a of FIG. 1) formed in the second surface (e.g., the second surface 122 of FIG. 1), and a second opening (e.g., the second opening 123a of FIG. 1) formed in the third surface (e.g., the third surface 123 of FIG. 1), and a connector (e.g., the connector 140 of FIG. 2) at least partially exposed through the first opening (e.g., the first opening 122a of FIG. 1) and the second opening (e.g., the second opening 123a of FIG. 1). The connector (e.g., the connector 140 of FIG. 2) may include a main body (e.g., the main body 210 of FIG. 2), a button part (e.g., the button part 220 of FIG. 2) seated on the main body (e.g., the main body 210 of FIG. 2) so as to be movable in the first direction or the second direction, a first elastic member (e.g., the first elastic member 310 of FIG. 3) mounted between the main body (e.g., the main body 210 of FIG. 2) and the button part (e.g., the button part 220 of FIG. 2), a movable part (e.g., the movable part 230 of FIG. 2) seated on the main body (e.g., the main body 210 of FIG. 2) so as to be movable in the third direction, and a second elastic member (e.g., the second elastic member 410 of FIG. 4) mounted between the main body (e.g., the main body 210 of FIG. 2) and the movable part (e.g., the movable part 230 of FIG. 2). A portion of the button part (e.g., the button part 220 of FIG. 2) may be exposed through the first opening (e.g., the first opening 122a of FIG. 1), and a portion of the movable part (e.g., the movable part 230 of FIG. 2) may be exposed through the second opening (e.g., the second opening 123a of FIG. 1).

According to various embodiments, the movable part (e.g., the movable part 230 of FIG. 2) may move toward the inside of the electronic device (e.g., the electronic device 101 of FIG. 1) when a portion of an external connector (e.g., the external connector 170 of FIG. 1) for mounting the accessory device is introduced through the second opening (e.g., the second opening 123a of FIG. 1). The button part (e.g., the button part 220 of FIG. 2) may include a button exposed through the first opening (e.g., the first opening 122a of FIG. 1) and a protruding structure (e.g., the protruding structure 223 of FIG. 2) coupled with the external connector (e.g., the external connector 170 of FIG. 1). The protruding structure (e.g., the protruding structure 223 of FIG. 2) may be coupled with the external connector (e.g., the external connector 170 of FIG. 1) by an elastic force of the first elastic member (e.g., the first elastic member 310 of FIG. 3). The protruding structure (e.g., the protruding structure 223 of FIG. 2) may include an inclined surface that faces toward the second opening (e.g., the second opening 123a of FIG. 1), and a portion of the external connector (e.g., the external connector 170 of FIG. 1) may be moved along the inclined surface toward the inside of the electronic device (e.g., the electronic device 101 of FIG. 1).

According to various embodiments, the button part (e.g., the button part 220 of FIG. 2) may have a stair form, the protruding structure (e.g., the protruding structure 223 of FIG. 2) may be mounted on a first step of the stair form, and the button may be mounted on a second step of the stair form. A portion of the movable part (e.g., the movable part 230 of FIG. 2) may make contact with a stair surface between the first step and the second step when the protruding structure (e.g., the protruding structure 223 of FIG. 2) is coupled with the external connector (e.g., the external connector 170 of FIG. 1).

According to various embodiments, the button part (e.g., the button part 220 of FIG. 2) may have a plate form.

The button may be mounted on a first surface of the plate, and the protruding structure (e.g., the protruding structure 223 of FIG. 2) may be mounted on a second surface of the plate.

According to various embodiments, the protruding structure (e.g., the protruding structure 223 of FIG. 2) may be separated from the external connector (e.g., the external connector 170 of FIG. 1) when external pressure is applied to the button, and the external connector (e.g., the external connector 170 of FIG. 1) may be withdrawn outside the electronic device (e.g., the electronic device 101 of FIG. 1) by an elastic force of the second elastic member (e.g., the second elastic member 410 of FIG. 4).

According to various embodiments, the button part (e.g., the button part 220 of FIG. 2) may further include a protrusion that prevents separation of the button part (e.g., the button part 220 of FIG. 2) by the first elastic member (e.g., the first elastic member 310 of FIG. 3).

According to various embodiments, the movable part (e.g., the movable part 230 of FIG. 2) may include a plate exposed through the second opening (e.g., the second opening 123a of FIG. 1) and a support (e.g., the support 232 of FIG. 4) that is located on an inner surface of the plate and that fixes the second elastic member (e.g., the second elastic member 410 of FIG. 4). The support (e.g., the support 232 of FIG. 4) may include a plurality of supports formed on opposite side surfaces of the button part (e.g., the button part 220 of FIG. 2). The support (e.g., the support 232 of FIG. 4) may include a protrusion that fixes the second elastic member (e.g., the second elastic member 410 of FIG. 4). The support (e.g., the support 232 of FIG. 4) may include one or more stopping structures that prevent separation of the movable part (e.g., the movable part 230 of FIG. 2) by the second elastic member (e.g., the second elastic member 410 of FIG. 4). The stopping structures may be disposed to be symmetric with respect to the support (e.g., the support 232 of FIG. 4).

According to various embodiments, the plate may form a smooth surface with the third surface (e.g., the third surface 123 of FIG. 1) when the stopping structures are stopped by an inner surface of the main body (e.g., the main body 210 of FIG. 2). The plate may have the same material or the same color as the third surface of the housing (e.g., the housing 120 of FIG. 1).

According to various embodiments, the main body (e.g., the main body 210 of FIG. 2) may include a guide protrusion protruding toward the button part (e.g., the button part 220 of FIG. 2), and the guide protrusion may guide a movement path of the button part (e.g., the button part 220 of FIG. 2).

According to various embodiments, the main body (e.g., the main body 210 of FIG. 2) may include one or more holes for fixing the connector (e.g., the connector 140 of FIG. 2) to an inner surface of the housing (e.g., the housing 120 of FIG. 1).

According to various embodiments, the electronic device (e.g., the electronic device 101 of FIG. 1) may further include a display (e.g., the display 110 of FIG. 1), and the accessory device may be an electronic pen that generates a touch input or a hovering input on the display (e.g., the display 110 of FIG. 1).

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device to which an accessory device is attachable, the electronic device comprising:
    a housing including a first surface configured to face a first direction, a second surface configured to face a second direction opposite to the first direction, a third surface configured to face a third direction perpendicular to the first direction or the second direction, a first opening formed in the second surface, and a second opening formed in the third surface; and a connector at least partially exposed through the first opening and the second opening, wherein the connector includes:

a main body;

a button part seated on the main body so as to be movable in the first direction or the second direction;

a first elastic member mounted between the main body and the button part;

a movable part seated on the main body so as to be movable in the third direction; and a second elastic member mounted between the main body and the movable part, and wherein a portion of the button part is exposed through the first opening, and a portion of the movable part is exposed through the second opening.

2. The electronic device of claim 1, wherein the movable part moves toward the inside of the electronic device when a portion of an external connector for mounting the accessory device is introduced through the second opening.

3. The electronic device of claim 2, wherein the button part includes:

a button exposed through the first opening; and a protruding structure coupled with the external connector.

4. The electronic device of claim 3, wherein the protruding structure is coupled with the external connector by an elastic force of the first elastic member.

5. The electronic device of claim 3, wherein the protruding structure includes an inclined surface configured to face toward the second opening, and wherein a portion of the external connector is moved along the inclined surface toward the inside of the electronic device and is coupled with the protruding structure.

6. The electronic device of claim 3, wherein the button part has a stair form, wherein the protruding structure is mounted on a first step of the stair form, and wherein the button is mounted on a second step of the stair form.

7. The electronic device of claim 6, wherein a portion of the movable part makes contact with a stair surface between the first step and the second step when the protruding structure is coupled with the external connector.

8. The electronic device of claim 3, wherein the button part has a plate form, wherein the button is mounted on a first surface of the plate, and wherein the protruding structure is mounted on a second surface of the plate.

9. The electronic device of claim 3, wherein the protruding structure is separated from the external connector when external pressure is applied to the button, and wherein the external connector is withdrawn outside the electronic device by an elastic force of the second elastic member.

10. The electronic device of claim 3, wherein the button part further includes a protrusion configured to prevent separation of the button part by the first elastic member.

11. The electronic device of claim 1, wherein the movable part includes:

a plate exposed through the second opening; and a support located on an inner surface of the plate and configured to fix the second elastic member.

12. The electronic device of claim 11, wherein the support includes one or more stopping structures configured to prevent separation of the movable part by the second elastic member.

13. The electronic device of claim 12, wherein the plate forms a smooth surface with the third surface when the stopping structures are stopped by an inner surface of the main body.

14. The electronic device of claim 11, wherein the plate has the same material or the same color as the third surface of the housing.

15. The electronic device of claim 1, wherein the main body includes a guide protrusion protruding toward the button part, and wherein the guide protrusion guides a movement path of the button part.

* * * * *